May 23, 1972   J. H. RICHARDSON, JR   3,664,601

WIRE PAY-OFF APPARATUS

Filed June 1, 1970

INVENTOR
James H. Richardson, Jr.
BY
Pennie, Edmonds, Morton, Taylor & Adams
ATTORNEYS 3,664,601
WIRE PAY-OFF APPARATUS
James H. Richardson, Jr., Littleton, Colo., assignor to CF & I Steel Corporation, Denver, Colo.
Filed June 1, 1970, Ser. No. 42,211
Int. Cl. B65h 49/00
U.S. Cl. 242—129                                4 Claims

ABSTRACT OF THE DISCLOSURE

There is disclosed an apparatus for receiving and holding a coiled and tempered wire in a vertical position, the apparatus securely holding the coiled wire while permitting paying out of the wire from the coil horizontally without coil rotation.

BACKGROUND OF THE INVENTION

The handling of oil tempered wire presents many problems. Such wire wants to remain straight and has a natural tendency to "bloom out" when in coil form. Former practice in handling oil tempered wire has been to place a wire coil on a horizontal stand consisting of a circular basket with a center arbor. This structure forms a cradle for the coil of wire. When the start end of the wire is pulled, one or more convolutions are reduced in diameter and come into contact witht he center arbor causing the stand and coil of wire to rotate.

In accordance with the present invention however, no center arbor is provided which provides economy of space. Also, the cage does not rotate and therefore less power is needed to pay-off wire.

SUMMARY OF THE INVENTION

The present invention provides a structural cage of generally cylindrical form which stands vertically. Means are provided for permitting entry to the cage for placing therein a coil of wire. About the axis of the cage is arranged a series of struts inclining toward the center which are rigidly affixed to a series of concentric rings. Wire will be paid off the coil in a helix guided by the rings.

Various aspects of the invention will be found upon an examination of the detailed specification which follows and the accompanying drawing.

DESCRIPTION OF A PREFERRED EMBODIMENT

Figure 1:
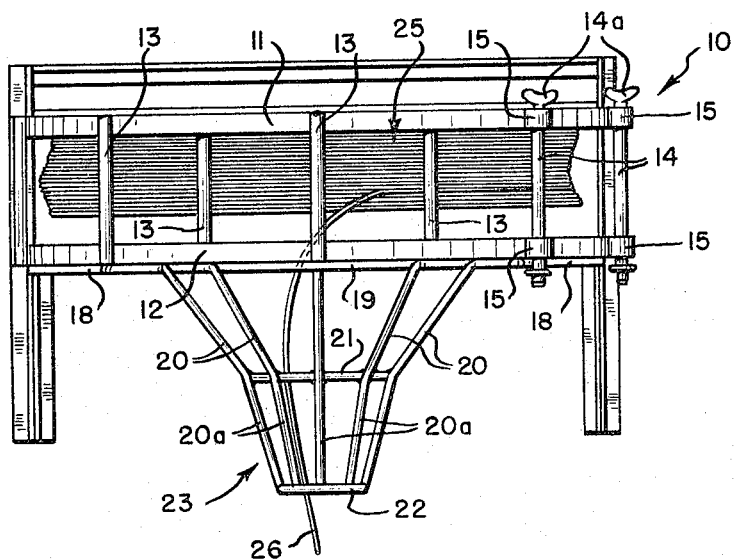
FIG. 1 is a plan view of an apparatus constructed according to the present invention.
Figure 2:
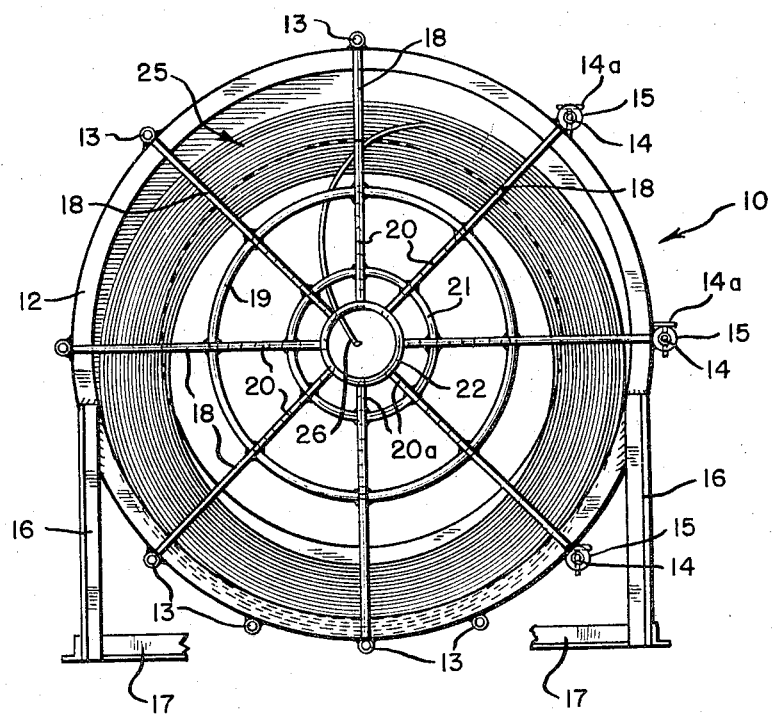
FIG. 2 is a side elevation of the apparatus of FIG. 1.

Wire coil pay-off apparatus constructed according to the present invention comprises two first rings 11 and 12 of equal diameter spaced apart by a series of fixed bars 13 to form a generally cylindrical cage 10. Pins 14 are slidably removable from sleeves 15 provided in rings 11 and 12 and are threaded at one end to receive wing nuts 14a. A pair of vertical legs 16 are welded to rings 11 and 12 and to feet 17 to form a stand to position cage 10 vertically.

A series of radial spokes 18 are attached to the rings 11 and 12 to complete the cage 10. On the side in which ring 12 is located, a third ring 19 of smaller diameter and concentric about the axis of the cage 10 is attached to the inner ends of the spokes 18. Proceeding laterally from the ring 19 are a series of struts 20 which incline toward the cage axis. Struts 20 are joined intermediate their lengths by a fourth concentric ring 21 and at their outer ends by a fifth concentric ring 22. Rings 21 and 22 are of decreasing diameter with respect to ring 19 thus forming with struts 20a a truncated cone-shaped secondary cage 23.

In using the apparatus of the present invention first, the pins 14 will be removed from sleeves 15. A coil of wire 25 may then be rolled into the opening provided in the side of the apparatus 10 to rest upon the lowermost fixed pins 13. The pins 14 will then be reinstalled to close the cage. The shipping bands will then be removed from the coil 25. The coil is now free to expand and one or more convolutions of wire will come into contact with bars 13 and pins 14. When the start end 26 of coil 25 is threaded through secondary cage 23 the wire from each expanded convolution (as the wire is payed out) will form a helix. Rings 19, 21 and 22 are so placed as to be on the tangent points of the helix formed by the wire as it exits from the cage.

The present invention takes advantage of the fact that the inherent straightness of oil tempered wire will force free one or more convolutions of wires ahead of the demand for the wire. The freed convolutions are confined by bars 13 and pins 14 while rings 19, 21 and 22 guide the wire as it would naturally flow in a helix from the expanding coil.

The apparatus of the present invention will accommodate oil tempered wires in regular mill or block wound coils without special preparation and will handle coils weighing three to four times as much as can be accommodated by prior art pay-out apparatus.

The foregoing description is of a preferred embodiment and is therefore merely representative. In order to appreciate fully the spirit and scope of the invention, reference should be made to the appended claims.

The following is claimed:

1. A wire paying off apparatus comprising two rings of the same diameter, a plurality of circumferentially spaced bars affixed to said rings to define therewith a hollow cylindrical enclosure for receiving a free-standing coil of wire, some of said bars being removable to permit placing a coil of wire into said enclosure, a plurality of spokes extending from each of said rings towards the center thereof, a third ring of smaller diameter than said first-named rings arranged concentrically with respect to one of said first-named rings, a plurality of struts extending from said third ring, a fourth ring of smaller diameter than said third ring joined to said struts at points intermediate their ends, and a fifth ring of smaller diameter than said fourth ring joined to said struts at the outer ends thereof, said struts and third, fourth and fifth rings defining a hollow enclosure of generally truncated cone-shape conforming to points of contact with a helix formed naturally by wire from said coil as it is payed out from the coil through said last-named enclosure and through said fifth ring.

2. The apparatus of claim 1 in which the third, four and fifth rings are of such diameter as to provide contact with wire being payed out along the natural helix formed by the wire.

3. The apparatus of claim 2 wherein said first-named rings are supported by a vertical stand to position the axis of said cylindrical enclosure horizontally.

4. The apparatus of claim 1 wherein said cylindrical enclosure is defined by circumferentially spaced bars parallel to the axis of said cylindrical enclosure to contain the initial loose rings of wire from said coil and to prevent the wire from assuming its natural straight condition thereby freeing said initial rings from the remainder of said coil and permitting ease of paying out without tangling of said wire.

References Cited

UNITED STATES PATENTS

| | | | |
|---|---|---|---|
| 3,018,066 | 1/1962 | Crum | 242—128 |
| 2,739,766 | 3/1956 | Rayburn | 242—128 |

LEONARD D. CHRISTIAN, Primary Examiner